United States Patent Office 2,841,482
Patented July 1, 1958

2,841,482

HERBICIDAL CHEMICAL COMPOSITIONS

Arthur W. Swezey, Garden Grove, and Robert W. Nex, Bellflower, Calif., assignors to The Dow Chemical Company, Midland, Mich., a corporation of Delaware No Drawing. Application March 5, 1953
Serial No. 340,666

7 Claims. (Cl. 71—2.3)

This invention is concerned with agricultural chemical compositions and is particularly directed to concentrate and spray compositions comprising 2,4-dinitro-6-alkyl-phenol compounds.

The 2,4-dinitro-6-alkyl-phenols and their salts have been widely employed as herbicidal toxicants in the preparation of compositions for the control of undesired vegetation. The fields of application of these products have been many, with particular emphasis in use being predicated upon their relative specificity for broad-leafed vegetation. Thus, aqueous compositions containing the dinitro-phenolic compounds have been utilized as selective herbicides for controlling broad-leafed weeds in grains and other economic crops such as peas and alfalfa tolerance for the nitro-phenolic toxicants in the compositions employed.

Also, formulations have been prepared comprising the dinitro-phenolic compounds in mixture with certain carriers, wetting and dispersing agents, and particularly with relatively large volumes of liquid solvents of petroleum origin, and employed with some success in general plant growth control programs for the killing of both broad- and narrow-leaf plant species. Here, however, the relatively low toxicity of the dinitro-phenolic toxicant to grasses and the like has constituted a significant limiting factor in that the injury of graminaceous plants has frequently been superficial. Thus, an apparent economic control of mixed vegetation sometimes has constituted only a top-burning of the mature leaves of monocotyledonous species, followed by a recovery of the burned vegetation from the unaffected growing points.

It is an object of the present invention to provide a new composition of matter in the form of an agricultural chemical concentrate adapted subsequently to be readily diluted with water to produce spray compositions comprising 2,4-dinitro-6-alkyl-phenols, which spray compositions have utilities not characterizing previously known dinitro-phenolic mixtures. It is a further object to provide a composition comprising a 2,4-dinitro-6-alkyl-phenol and an additament which composition is characterized by the synergistic activity of its components in matters pertaining to biochemical control. Other objects will become apparent from the following specification and claims.

It has been found in accordance with the present invention that certain 2,4-dinitro-6-alkyl-phenols may be compounded with polyglycol aryl ether-alcohols to obtain novel agricultural chemical compositions which are characterized by unexpected utility upon dilution with water. The concentrates themselves are thick viscous liquids which disperse readily in water to produce spray mixtures which do not require continued mechanical agitation following the initial dispersion. Further, in many instances, the dinitro-phenolic constituent is solubilized in the water of dilution, and generally no further wetting or dispersing agent is required to obtain and maintain stable and homogeneous spray mixtures. The dilute aqueous spray mixtures are valuable for many agricultural uses including insecticidal, fungicidal, miticidal and herbicidal application, and particularly the latter since the combination of materials accomplishes a significant enhancement of the toxicity of the dinitro-phenolic constituent against graminaceous plants without comparably increasing its toxicity against broad-leafed vegetation. This enhancement of toxicity if of an order to permit the control of grasses with amounts of dinitro-phenolic toxicant frequently within the tolerance of economic broad-leafed species. Further, it obviates the necessity for using oils in combination with the dinitro-phenols to accomplish control of grasses. This is not only a significant economic advantage, but also permits the use of the dinitro-phenols for the control of grasses in and about crops which do not ordinarily tolerate oil. The polyglycol aryl ether-alcohol compound appears to serve as a synergist for the nitro-phenol whereby unpredictable and greater than additive results are obtained with spray mixtures containing the compositions of the invention, and particularly in herbicidal application.

The 2,4-dinitro-6-alkyl-phenols with which the invention is concerned are those of the formula

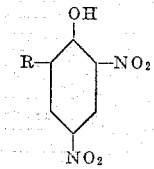

wherein R represents an alkyl radical of from 3 to 5 carbon atoms, inclusive. It is to be understood in the generic teaching of the present specification and in the claims that reference to "2,4-dinitro-6-alkyl-phenols" is to be considered as inclusive of those amine, ammonium, and inorganic salts of such phenols as are compatible with the polyglycol aryl ether-alcohol constituent of the claimed compositions.

The polyglycol aryl ether-alcohols employed as constituents of the present invention are those of the formula

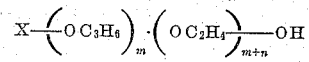

wherein X represents an aryl radical of the benzene series having a molecular weight of at least 91, $m$ represents an integer from 4 to 8, inclusive, and $n$ represents an integer from 0 to 6, inclusive. The term "aryl" is herein employed in its conventional definition as being an aromatic hydrocarbon radical such as tolyl, tertiarybutyl-phenyl, phenyl-phenyl, cyclohexylphenyl, alkylphenyl, di-(isopropyl)phenyl, benzylphenyl, tri-tertiarybutylphenyl and the like.

While any satisfactory and operable amounts of the dinitrophenolic compound and of the polyglycol aryl ether-alcohol may be employed, the molar proportions of the components in the compositions of the invention are believed critical. Thus to constitute a composition of optimum utility under the present invention, at least 3 molecular proportions by weight (moles) of the polyglycol aryl ether-alcohol should be present for each mole of the 2,4-dinitro-6-alkyl-phenol. A practical upper limit is about 21 moles of the polyglycol aryl ether-alcohol per mole of the dinitro-phenol, and a preferred range over which good results have been obtained is from 5 to 12 moles of the ether-alcohol compound per mole of the dinitro-phenol.

The precise amount of the concenetrate employed to accomplish a given herbicidal result is somewhat dependent upon the exact composition of the mixture within the described limits. Thus the minimum dosage, in pounds of 2,4-dinitro-6-alkyl-phenol per acre required to accomplish a satisfactory herbicidal control, is inversely proportional to the mole ratio of the polyglycol aryl ether-alcohol synergist to 2,4-dinitro-6-alkyl-phenol present in the mixture.

When operating in accordance with the invention, the primary composition is preferably a concentrate, but dilute aqueous sprays may be compounded directly, if desired. In the preparation of the concentrate, the 2,4-dinitro-6-alkyl-phenol may be melted and the polyglycol aryl ether-alcohol compound poured into the molten phenol with stirring to obtain a homogeneous mixture. Alternatively, the molten dinitro-phenol may be added to the polyglycol compound, or the two materials may simply be mixed together and warmed and stirred. In either event, a viscous liquid product is obtained from which there appears to be little or no tendency for the separation of constituents. Such a concentrate is simply poured into water with stirring to accomplish the preparation of relatively stable dilute spray mixtures.

The direct preparation of dilute spray mixtures is somewhat more difficult and less desirable. It may involve the use of supplemental organic solvents and dispersing agents to accomplish the blending and association together of the dinitro-phenolic and polyglycol aryl ether-alcohol constituents.

In field application, the minimum operable dosage of the 2,4-dinitro-6-alkyl-phenol in the compositions of the invention is approximately 0.25 pound per acre of area to be treated. Such dosage is effective against small seedling growth. The lower practical range begins at about 0.5 pound per acre. These dosages of materials are ordinarily applied in from 30 to 300 gallons of spray per acre, with about 100 gallons of spray being the preferred volume. In air application and for specialized usages, the volume of spray material may be as low as 10 to 15 gallons per acre. In each instance above, somewhat higher volumes may be desirable and necessary in situations involving dense overgrown weeds, or where the susceptible graminaceous plants are protected by a dense overgrowth of non-susceptible species. Contact of the foliage is essential, and must be considered in determining mode of application, dosages and spray volumes.

Conditions may be found where the inclusion of supplemental wetting and dispersing agents will prove desirable. Similarly, co-solvents such as aromatic oils or other suitable organic liquids may sometimes be employed. Also, other toxicants such as herbicidal oils, dyes, or other additaments may find use in specialized situations.

The preparation of the polyglycol aryl ether-alcohol compounds employed in accordance with the invention may be accomplished by successively reacting a molar proportion of a suitable hydrocarbon-substituted phenol (1) with from 0.1 to 0.25 mole of metallic sodium, (2) with from 4 to 8 moles of propylene oxide, and (3) with an amount of ethylene oxide at least equal to and up to 6 moles in excess of the molar proportion of propylene oxide employed. The second and third stages above, in which the phenoxide product is reacted with the alkylene oxides, are carried out under autogenous pressure and at 100°–150° C. The crude reaction product obtained may be purified as by blowing with carbon dioxide and treating with water to remove residual alkali, clarification, filtration, low temperature distillation under reduced pressure to remove water and traces of low boiling constituents, etc. The resulting products are viscous liquids at room temperature, soluble in aromatic oils, and readily dispersible in water. In aqueous solution, they accomplish a significant lowering of surface tension and so function as wetting and dispersing agents. The following table sets forth data on combining proportions of phenols, propylene oxide, and ethylene oxide, found to yield polyglycol aryl ether-alcohols operable in accordance with the present invention and identifying physical characteristics of such compounds:

| Ether-alcohol Designation | Phenol | Moles of alkylene oxide per mole of phenol | | Density, 25°/25° C. | Refractive Index, $n \frac{25°\ C.}{D}$ |
| --- | --- | --- | --- | --- | --- |
| | | Propylene Oxide | Ethylene Oxide | | |
| I | 2,4-disecondarybutyl | 4 | 8 | 1.043 | 1.4777 |
| II | 2,4-ditertiarybutyl | 4 | 10 | 1.042 | 1.4780 |
| III | 2,4-disecondarybutyl | 4 | 5 | 1.022 | 1.4788 |
| IV | 2-phenyl | 5 | 5 | 1.072 | 1.5115 |
| V | 2,4-disecondarybutyl | 6.7 | 13.3 | 1.050 | 1.4726 |
| VI | ....do.... | 4 | 12 | 1.053 | 1.4755 |
| VII | ....do.... | 8 | 12 | 1.032(370/25°) | 1.4705 |
| VIII | 2,4,6-tritertiarybutyl | 4 | 10 | 1.033 | 1.4787 |
| IX | X-(alpha-methylbenzyl)-2 and 3-phenyl | 4 | 10 | 1.090 | 1.5159 |
| X | 2,4-ditertiarybutyl | 4 | 5 | 1.024 | 1.4800 |
| XI | 2-phenyl | 5 | 10 | 1.094 | 1.4938 |
| XII | ....do.... | 8 | 10 | 1.073 | 1.4868 |

Preferred embodiments of the invention include compositions comprising as the dinitro-phenolic toxicant, 2,4-dinitro-6-secondarybutyl-phenol, ammonium 2,4-dinitro-6-secondary butyl-phenolate, and alkanolamine salts of 2,4-dinitro-secondarybutyl-phenol and particularly the triethanol-amine salt. Preferred polyglycol aryl ether-alcohol compounds are those produced from either 2,4-di-secondarybutyl-phenol or 2,4-di-tertiarybutyl-phenol.

In the following illustrative examples, the polyglycol aryl ether-alcohols are designated as "ether-alcohols" with identifying Roman numerals as set forth in the above table.

EXAMPLE 1

1 mole of 2,4-dinitro-6-secondarybutyl-phenol was melted and 4.82 moles of ether-alcohol I added thereto with stirring to obtain a concentrate product as a viscous liquid containing 0.5 pound of 2,4-dinitro-6-secondarybutyl-phenol per gallon. 0.5 gallons of this product was diluted with water to produce 150 gallons of aqueous spray composition. The 2,4-dinitro-6-secondarybutyl-phenol appeared to be in solution. The dilution was accomplished in the tank of a conventional motor-driven spray rig, mixing being provided by continuous recirculation of the tank contents. The spray mixture was stable.

The spray mixture was applied by hand boom uniformly over portions of a dense mixed stand of red stem filaree (*Erodium cicutarium*) in rosette and 2.5 to 5.0 inch foxtail barley (*Hordeum murinum*) with good wetting and at a rate of 150 gallons per acre under a spray pressure of 100 pounds per square inch using a flat fan weed-spray nozzle. The day was clear to over-cast with temperatures of 65°–70° F.

Four days after treatment, the sprayed areas were examined and all growth found to exhibit superficial burning. The small growing points of the rosettes of filaree were observed as being green. Twelve days after treatment, the percent kill was observed as 98 percent on the foxtail barley and 5 percent on filaree. Thirty-five days after treatment, the condition of the sprayed areas was substantially the same as at the previous observation with the surviving filaree exhibiting normal growth. The vegetation in unsprayed check areas was vigorous throughout the determination.

EXAMPLE 2

1 mole of 2,4-dinitro-6-secondarybutyl-phenol was melted and 4.38 moles of ether-alcohol II added thereto with stirring to obtain a concentrate product as a viscous liquid containing 0.5 pound of the dinitro-phenol per gallon. This concentrate was stirred into water to obtain a dilute aqueous spray mixture of 2,4-dinitro-6-secondary-butyl-phenol and having a content of 3 gallons of the original concentrate per 100 gallons of the ultimate spray mixture. The 2,4-dinitro-6-secondarybutyl-phenol appeared to be in true solution in the mixture. The dilution was accomplished in the tank of a conventional motor-driven spray rig equipped with hand boom, with mixing provided for by continuous recirculation of the tank contents. The spray mixture was stable.

The spray mixture was applied uniformly over portions of a very dense mixed stand of oats 4 to 14 inches in height, common field mustard 10 to 12 inches in height, and annual yellow clover from 10 to 12 inches in height at a rate of 150 gallons per acre under a spray pressure of 90 pounds per square inch using a flat-fan spray nozzle. The day was partly cloudy with temperature of 65°–70° F. The sprayed areas had been thoroughly wet by rain 48 hours previously and were rained on again within 24 hours of treatment. Excellent wetting was obtained with the spray mixture of the surfaces of all plant species.

Three days after spraying, the treated plots were examined and the several plant species found to be browned or wilted but with the action of the herbicide treatment obviously not completed. Nine days after treatment, the plots were again examined. Kills of 95 percent against oats, 90 percent against field mustard, and 100 percent against annual yellow clover were observed. Vegetation in unsprayed check areas continued in a luxuriant state of growth.

EXAMPLE 3

1 mole of the triethanolamine salt of 2,4-dinitro-6-secondarybutyl-phenol was mixed with 5.61 moles of ether-alcohol III and warmed and stirred to obtain a concentrate A as a viscous liquid containing the equivalent of 0.5 pound of 2,4-dinitro-6-secondarybutyl-phenol per gallon. Similarly, 1 mole of the ammonium salt of 2,4-dinitro-6-secondarybutyl-phenol was mixed with 6.0 moles of ether-alcohol III to obtain a concentrate B as a viscous liquid containing the equivalent of 0.5 pound of 2,4-dinitro-6-secondarybutyl-phenol per gallon.

The above concentrates were separately diluted with water to obtain two spray mixtures each containing 1 gallon of concentrate per 100 gallons of mixture. The spray mixtures were stable and required no agitation following initial dispersion. The spray mixtures were applied uniformly at the rate of 200 gallons per acre, to the foliage of a stand of water-grass (*Echinochloa crus—Galli*) 3 to 5 inches in height and in a condition of succulent and vigorous growth. Spraying was carried out under 10 pounds per square inch pressure and at an air temperature of 78°–82° F. Five replications were made of each application with good wetting being obtained in all treatments.

Following the applications, the treated areas and unsprayed check areas were subjected to intermittent overhead irrigation totalling about 1 inch of water over a period of 17 days. At the end of this period, all plots were examined. Those treated with the composition comprising concentrate A, were found to exhibit an average kill of 80 percent. Those treated with the spray comprising concentrate B had undergone an average kill of 70 percent. The water-grass in control areas continued in a condition of vigorous growth.

EXAMPLE 4

In the manner described in Example 3, a quantity of 2,4-dinitro-6-secondarybuty-phenol was melted and portions of the melt separately mixed with a range of molar proportions of several polyglycol aryl ether-alcohols to obtain concentrates in the form of viscous liquids each containing 2,4-dinitro-6-secondarybutyl-phenol in the amount of 0.5 pound per gallon of concentrate.

Each of the above concentrates was separately diluted with water to obtain spray mixtures containing 1 gallon of concentrate per 100 gallons of mixture. The spray mixtures were stable and required no agitation following initial dispersion. Each spray mixture was applied uniformly at the rate of 200 gallons per acre to plots of noxious vegetation in a condition of succulent and vigorous growth. Spraying was carried out under 10 pounds per square inch pressure and at an air temperature of 78°–82° F. Good wetting was obtained in all treatments. The following table identifies the particular ether-alcohol and the mole proportion thereof to 2,4-dinitro-6-secondarybutyl-phenol employed in each series of replications. Also, the table sets forth the particular vegetation treated, the interval between treatment and examination and the percentage kill.

| Ether-Alcohol | Moles of Ether-Alcohol Per Mole of Dinitro-phenolic Constituent | Vegetation Sprayed | Interval in Days Between Spraying and Examination | Percentage Kill |
|---|---|---|---|---|
| V | 3.3 | Canary rye grass 6 to 10 inches high. | 8 | 70 |
| IV | 5.6 | Canary rye grass 7 to 10 inches high. | 16 | 85 |
| VI | 4.0 | Water grass 6 to 12 inches high. | 7 | 95 |
| VII | 3.2 | ___do___ | 8 | 95 |
| VIII | 4.1 | ___do___ | 8 | 100 |
| None | check plots | ___do___ | 8 | 0 |
| None | ___do___ | Canary rye grass 7 to 10 inches high. | 16 | 0 |

In the above table the figures given as percentage kills in each instance represent an average of 5 replications.

EXAMPLE 5

One mole of 2,4-dinitro-6-secondarybutyl-phenol was melted and 17.9 moles of ether-alcohol III added with stirring thereto to obtain a herbicide concentrate composition containing 0.167 pound of the 2,4-dinitro-6-secondarybutyl-phenol per gallon. This composition was applied for the control of a stand of water grass 5 to 7 inches high and of a vigorous and moderately succulent state of growth. The application rate was 3 gallons of the concentrate in 200 gallons of aqueous spray per acre treated. This amounted to a dosage of 0.5 pound of 2,4-dinitro-6-secondarybutyl-phenol per acre. The application was made in 5 replications, and under a pressure of 10 pounds per square inch and at an air temperature of 78°–82° F. Good wetting was obtained on all sprayed surfaces. Seven days after application, the treated plots were examined and found to exhibit 99 percent kill. Untreated check areas continued in a state of vigorous growth.

EXAMPLE 6

One mole of 2,4-dinitro-6-secondarybutyl-phenol was heated to melting temperature and 5.8 moles of ether-alcohol III added thereto with stirring to obtain a concentrate composition containing 0.5 pound of the dinitro-phenol per gallon. This product was compared with unmodified ether-alcohol III and a commercial composition comprising 1.25 pounds of 2,4-dinitro-6-secondarybutyl-phenol in sufficient of a mixture of aromatic oils and conventional dispersing and solubilizing agents to produce 1 quart of concentrate, to determine the comparative effectiveness of the three products against water grass. The test vegetation was 8 to 10 inches high and in dense vigorous stand approaching maturity. 10 replications were made of each application with all materials being applied in 200 gallons of dilute aqueous spray per acre. Application was made at 10 pounds per square inch pressure and at an air temperature of 78°–82° F. The treated areas and untreated spray areas were subject to intermittent overhead irrigation for a period of 10 days, at the end of which time all plots were examined. The water grass in the check plots continued in a condition of vigorous growth. The following table sets forth the results obtained with various amounts of 2,4-dinitro-6-secondarybutyl-phenol as found in the commercial herbicide concentrate, the concentrate of 0.5 pound of 2,4-dinitro-6-secondarybutyl-phenol per gallon of ether-alcohol III, and with the unmodified ether-alcohol III:

| Treating Composition | | Percent Kill |
|---|---|---|
| Pounds 2,4-dinitro-6-secondarybutyl-phenol per acre | Gallons ether-alcohol III per acre | |
| 0.75 | ---------- | 0 |
| 1.0 | ---------- | 0 |
| 1.5 | ---------- | 30 |
| ---------- | 1.5 | 0 |
| ---------- | 2.0 | 0 |
| ---------- | 3.0 | 0 |
| 1.5 | 3.0 | 85 |
| 0 | 0 | 0 |

EXAMPLE 7

1 mole of ammonium 2,4-dinitro-6-secondarybutyl-phenolate and 4.38 moles of ether-alcohol II were mixed together and warmed to obtain a concentrate composition as a viscous liquid containing the equivalent of 0.5 pound of 2,4-dinitro-6-secondarybutyl-phenol per gallon. This product was employed substantially as described in Example 3, at a rate of 2.0 gallons per acre in 200 gallons dilute aqueous spray to determine the effectiveness of the concentrate in the control of water grass, 3 to 5 inches in height. In comparative determinations ether-alcohol II was employed alone at the rate of 2 gallons per acre and dissolved in 200 gallons of water. Also, ammonium 2,4-dinitro-6-secondarybutyl-phenolate (modified with a few drops of commercial wetting and dispersing agent) at 1 pound per acre in 200 gallons of water was applied. Following the application, optimum growth conditions were provided through intermittent overhead irrigation. Treated and check plots were examined after an interval of 7 days. The untreated areas were found to have continued in a state of vigorous growth. The 5 replicates of plots treated with the concentrate of the dinitro-phenolate and ether-alcohol II exhibited an average kill of 80 percent. The replicated plots treated with 2 gallons per acre of unmodified ether-alcohol II averaged 5 percent kill. The replications of plots treated with ammonium 2,4-dinitro-6-secondarybutyl-phenolate at 1 pound per acre and in 200 gallons of spray, averaged 30 percent kill.

EXAMPLE 8

A concentrate composition of 2,4-dinitro-6-secondarybutyl-phenol and ether-alcohol III was prepared in the proportions and manner described in Example 6. This product was compared in varying dosage with unmodified ether-alcohol III and the described 2,4-dinitro-6-secondarybutyl-phenol composition all as described in Example 6 to determine the effectiveness of the concentrate and its components against a lush growth of canary rye grass 4 to 5 inches high. All applications were at the rate of 200 gallons per acre and in 10 replications. Eight days after treatment all plots were examined for injury. The check areas had continued in a state of vigorous growth. The following table sets forth the observed results and the dosages employed:

| Gallons of Ether-Alcohol III per acre | Pounds of 2,4-dinitro-6-secondarybutyl-phenol per acre | Percent Injury |
|---|---|---|
| 1.5 | 0 | 4 |
| 2. | 0 | 3.5 |
| 3. | 0 | 15. |
| 4. | 0 | 26. |
| 1 | 0.5 | 97 |
| 1.5 | 0.75 | 99 |
| 2.0 | 1.0 | 99 |
| 3.0 | 1.5 | 99 |
| 4.0 | 2.0 | 99.5 |
| 0 | 0.5 | 25 |
| 0 | 0.75 | 31 |
| 0 | 1.0 | 56 |
| 0 | 1.5 | 71 |
| 0 | 2.0 | 90 |
| 0 (checks) | 0 | 0 |

EXAMPLE 9

The following illustrate other concentrate compositions of the polyglycol aryl ether-alcohols and 2,4-dinitro-phenols adapted to be employed in aqueous dispersion in biochemical control operations. In the preparation of these concentrates, the dinitro-phenol and indicated ether-alcohol are warmed and stirred together. Relatively stable aqueous dispersions of the resulting viscous liquid products are obtained by mixing the appropriate amount of concentrate with sufficient water to obtain the desired volume of spray.

*Composition 1*

0.5 lb. (0.894 mole)—2,4-dinitro-6-secondaryamyl-phenol
8.0 lbs. (4.6 moles)—The product of 2,4-di-secondarybutyl-phenol successively condensed with 4 moles of propylene oxide and 8 moles of ethylene oxide

*Composition 2*

0.5 lb. (0.945 mole)—2,4-dinitro-6-tertiarybutyl-phenol
8.0 lbs. (4.6 moles)—2,4-di-secondarybutyl-phenol condensation product with 4 moles of propylene oxide followed by 8 moles of ethylene oxide

*Composition 3*

0.5 lb. (1.00 mole)—2,4-dinitro-6-isopropyl-phenol
8.0 lbs. (4.6 moles)—2,4-di-secondarybutyl-phenol condensation product with 4 moles of propylene oxide followed by 8 moles of ethylene oxide

*Composition 4*

0.5 lb. (0.945 mole)—2,4-dinitro-6-normalbutyl-phenol
8.0 lbs. (4.6 moles)—2,4-di-secondarybutyl-phenol condensation product with 4 moles of propylene oxide followed by 8 moles of ethylene oxide

*Composition 5*

0.5 lb. (0.945 mole)—2,4 - dinitro - 6 - secondarybutyl-phenol
8.0 lbs. (4.96 moles)—4-tertiarybutyl-phenol condensation product with 4 moles of propylene oxide followed by 8 moles of ethylene oxide

*Composition 6*

0.5 lb. (0.945 mole)—2,4 - dinitro - 6 - secondary - butyl-phenol
8.0 lbs. (5.25 moles)—2-methylphenol condensation product with 4 moles of propylene oxide followed by 8 moles of ethylene oxide

*Composition 7*

0.5 lb. (0.945 mole)—2,4-dinitro-6-secondary-butyl-phenol
8.0 lbs. (4.85 moles)—2-cyclohexyl-phenol condensation product with 4 moles of propylene oxide followed by 8 moles of ethylene oxide

Composition 8

0.5 lb. (0.945 mole)—2,4-dinitro-6-secondarybutyl-phenol 8.0 lbs. (4.78 moles)—4-benzyl-phenol condensation product with 4 moles of propylene oxide followed by 8 moles of ethylene oxide

Composition 9

0.5 lb. (0.945 mole)—2,4-dinitro-6-secondarybutyl-phenol 8.0 lbs. (5.35 moles)—2-allyl-phenol condensation product with 4 moles of propylene oxide followed by 8 moles of ethylene oxide

We claim:

1. A composition of matter comprising a component (1) which is a 2,4-dinitro-6-alkyl-phenol of the formula

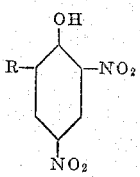

wherein R represents an alkyl radical containing from 3 to 5 carbon atoms, inclusive, and a component (2) which is a polyglycol aryl ether-alcohol compound of the formula

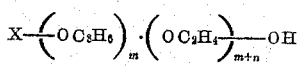

wherein X represents an aryl radical of the benzene series having a molecular weight of at least 91, $m$ represents an integer from 4 to 8 inclusive, and $n$ represents an integer from 0 to 6, inclusive, and containing at least about 3 moles of component (2) for each mole of component (1).

2. A composition in accordance with claim 1 containing from 4 to 21 moles of component (2) for each mole of component (1).

3. A composition in accordance with claim 1 containing from 5 to 12 moles of component (2) for each mole of component (1).

4. A composition in accordance with claim 1 wherein component (1) is 2,4-dinitro-6-secondarybutyl-phenol.

5. A composition in accordance with claim 1 wherein component (2) is a polyglycol aryl ether-alcohol of 2,4-di-secondarybutyl-phenol.

6. A composition in accordance with claim 1 wherein component (2) is a polyglycol aryl ether-alcohol of 2,4-di-tertiarybutyl-phenol.

7. A spray composition comprising a dilute aqueous dispersion of a concentrate comprising a component (1) which is a 2,4-dinitro-6-alkyl-phenol of the formula

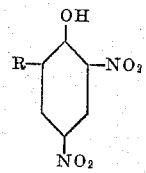

wherein R represents an alkyl radical containing from 3 to 5 carbon atoms, inclusive, and a component (2) which is a polyglycol aryl ether-alcohol compound of the formula

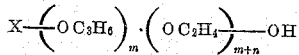

wherein X represents an aryl radical of the benzene series having a molecular weight of at least 91, $m$ represents an integer from 4 to 8, inclusive, and $n$ represents an integer from 0 to 6, inclusive, and containing at least about 3 moles of component (2) for each mole of component (1), and in which spray composition the concentration of 2,4-dinitro-6-alkyl-phenol is at least 0.5 pound per 100 gallons.

References Cited in the file of this patent

UNITED STATES PATENTS

| 2,174,761 | Scheutte et al. | Oct. 3, 1939 |
| 2,392,859 | Meuli | Jan. 15, 1946 |
| 2,623,818 | Hanson et al. | Dec. 30, 1952 |

UNITED STATES PATENT OFFICE
CERTIFICATE OF CORRECTION

July 1, 1958

Patent No. 2,841,482

Arthur W. Swezey et al.

It is hereby certified that error appears in the printed specification of the above numbered patent requiring correction and that the said Letters Patent should read as corrected below.

Column 4, line 51, for "0.5 gallons" read -- 4.5 gallons --.

Signed and sealed this 9th day of June 1959.

(SEAL)
Attest:

KARL H. AXLINE
Attesting Officer

ROBERT C. WATSON
Commissioner of Patents